United States Patent
Lee et al.

(10) Patent No.: US 10,077,086 B2
(45) Date of Patent: Sep. 18, 2018

(54) STRUCTURE FOR MOUNTING SPARE TIRE FOR ANTITHEFT

(71) Applicant: Hyundai Motor Company, Seoul (KR)

(72) Inventors: Chul-Woo Lee, Anyang-si (KR); Sung-Dae Kim, Yongin-si (KR); Hyo-Sik Kim, Seoul (KR); Ki-Ho Yum, Seoul (KR)

(73) Assignee: Hyundai Motor Company, Seoul (KR)

( * ) Notice: Subject to any disclaimer, the term of this patent is extended or adjusted under 35 U.S.C. 154(b) by 33 days.

(21) Appl. No.: 15/289,778

(22) Filed: Oct. 10, 2016

(65) Prior Publication Data

US 2017/0203800 A1   Jul. 20, 2017

(30) Foreign Application Priority Data

Jan. 20, 2016 (KR) .................. 10-2016-0006847

(51) Int. Cl.
*B62D 43/04* (2006.01)
*B62D 43/00* (2006.01)

(52) U.S. Cl.
CPC ........... *B62D 43/007* (2013.01); *B62D 43/04* (2013.01); *B62D 43/045* (2013.01)

(58) Field of Classification Search
CPC .... B62D 43/007; B62D 43/04; B62D 43/045; B62D 43/02; B62D 43/06; B62D 43/08; B62D 43/10
See application file for complete search history.

(56) References Cited

U.S. PATENT DOCUMENTS

| | | | | |
|---|---|---|---|---|
| 3,865,264 A | * | 2/1975 | Kuhns | B62D 43/045 224/42.23 |
| 4,535,973 A | * | 8/1985 | Dorr | B62D 43/045 224/42.12 |
| 4,600,352 A | * | 7/1986 | Ivan | B62D 43/045 242/407 |
| 5,368,280 A | * | 11/1994 | Ng | B62D 43/045 254/323 |
| 5,681,137 A | * | 10/1997 | Stallings | B62D 43/045 254/323 |

(Continued)

FOREIGN PATENT DOCUMENTS

| | | |
|---|---|---|
| CN | 2563055 Y | 7/2003 |
| CN | 201086693 Y | 7/2008 |

(Continued)

*Primary Examiner* — Corey Skurdal
(74) *Attorney, Agent, or Firm* — Morgan, Lewis & Bockius LLP (57) ABSTRACT

A structure for mounting a spare tire for antitheft may include a carrier support bracket on which a spare tire is mounted, a bracket mounted at a bottom surface of a vehicle and supporting the spare tire, and a carrier winding or unwinding a wire mounted at the carrier support bracket in order for the spare tire to be moved upwardly and downwardly, the carrier further including a carrier housing including a top surface formed with a through hole, and a bottom surface formed with a projecting hole, a shaft bolt rotatably mounted at the carrier housing and adapted to wind or unwind the wire by rotation thereof, and a socket to transmit a torque applied from an outside of the vehicle to the shaft bolt or to block the torque not to be transmitted to the shaft bolt.

20 Claims, 7 Drawing Sheets

(56) References Cited

U.S. PATENT DOCUMENTS 6,132,162 A * 10/2000 Kito .................... B62D 43/045
254/323

FOREIGN PATENT DOCUMENTS

| | | |
|---|---|---|
| JP | S 60-67285 U | 5/1985 |
| JP | 2000-168636 A | 6/2000 |
| JP | 2004-034890 A | 2/2004 |
| JP | 2007-069759 A | 3/2007 |
| KR | 10-2006-0033258 A | 4/2006 |
| KR | 10-2008-0024645 A | 3/2008 |
| KR | 10-2012-0060090 A | 6/2012 |
| KR | 10-2013-0030591 A | 3/2013 |

* cited by examiner

SOCKET INSERTION
BY EXTERNAL FORCE

STRUCTURE FOR MOUNTING SPARE TIRE FOR ANTITHEFT

CROSS-REFERENCE TO RELATED APPLICATION

The present application claims priority to Korean Patent Application No. 10-2016-0006847, filed Jan. 20, 2016, the entire contents of which is incorporated herein for all purposes by this reference.

BACKGROUND OF THE INVENTION

Field of the Invention

The present invention relates to a structure for mounting a spare tire for antitheft, and more particularly, to a structure for mounting a spare tire for antitheft capable of easily mounting the spare tire in a manufacturing process and preventing a shaft bolt from being operated outside after vehicle delivery.

Description of Related Art

A conventional spare tire of a vehicle has been mounted on a vehicle in order to replace when a tire in use is damaged or broken for several reasons.

The ways that the spare tire as mentioned above is mounted on and supported to a vehicle are different from each other depending on the type of the vehicle. In the case of passenger vehicles, the spare tire has been inserted into and mounted on separate storage space formed at a trunk room. On the other hand, in the case of commercial vehicles or SUV (Sports Utility Vehicles), the spare tire has been typically mounted at and supported to a lower portion of a floor panel via a carrier 30 and a wire W because a storage space is not provided thereat.

Figure 1:
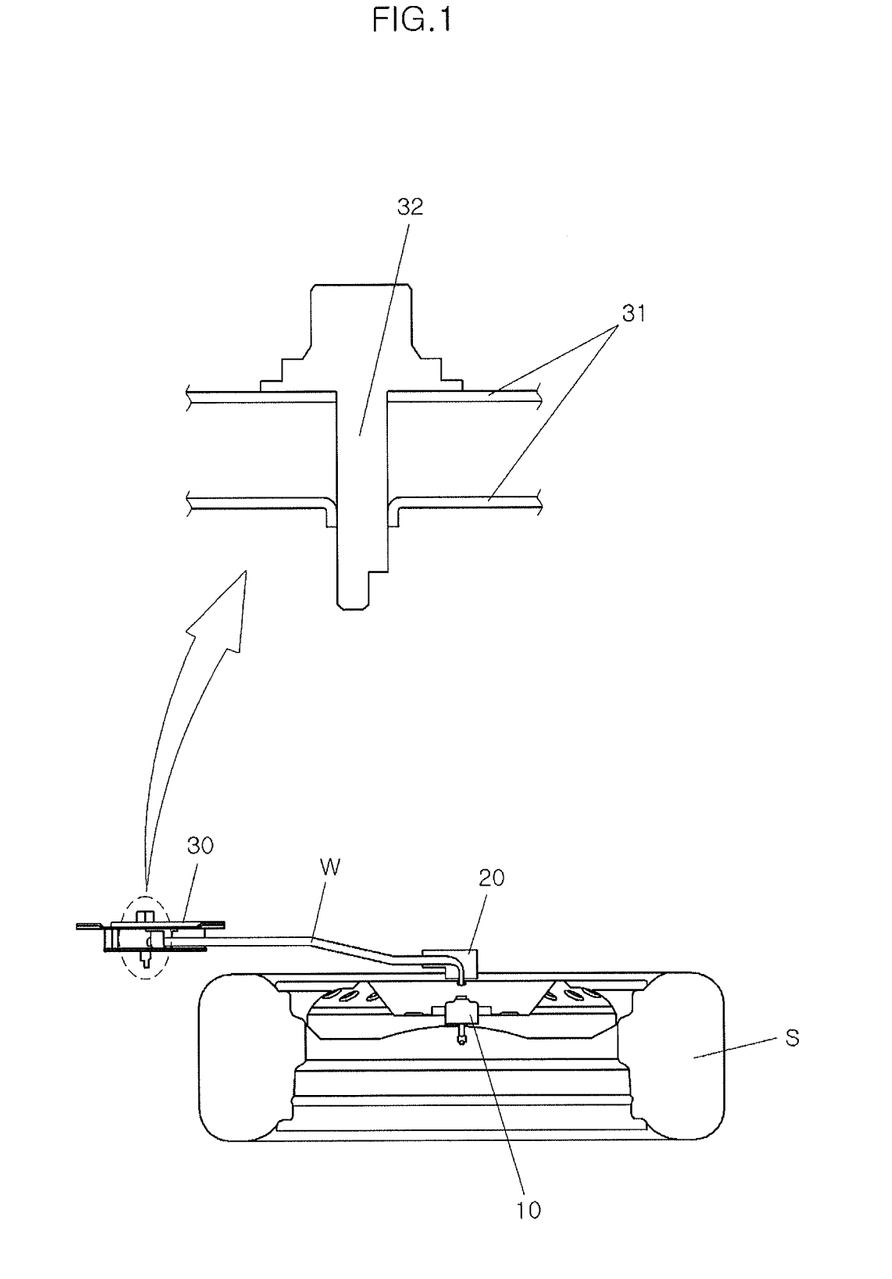
FIG. 1 is drawing illustrating the problems in the related art.

FIG. 1 is a drawing illustrating the problems in the related art. As shown in FIG. 1, the conventional spare tire S includes a carrier 30 of which a wire W is able to be wound or unwound via proper tools such as a wrench, a carrier support bracket 10 which is connected to one end of the wire W wound at a wire winding device and able to be attached at or released from the spare tire S. Thus, the spare tire S is mounted on a vehicle by connecting it with the carrier support bracket 10 and then winding the wire W through the carrier 30.

Explaining more in detail, the spare tire S may be risen to be mounted on a vehicle by rotating an upper end portion of a shaft bolt 32 in one direction (for example, clockwise rotation) or a lower end portion of the shaft bolt 32 in a reverse direction (for example, counterclockwise). Conversely, the spare tire S may be descended to be separated from a vehicle by rotating the upper end portion of a shaft bolt 32 in the reverse direction (for example, counterclockwise) or the lower end portion of the shaft bolt 32 in the one direction (for example, clockwise rotation).

In the related art, the lower end portion of the shaft bolt 32 of the carrier 30 is exposed to the outside of a vehicle. This is to easily mount the spare tire in the manufacturing process of a vehicle. However, since the lower end portion of the shaft bolt 32 is exposed to the outside of a vehicle as above, it is able to operate the shaft bolt 32 from the outside of a vehicle so that there is the problem that spare tire theft occurs frequently.

The above information disclosed in this Background section is only for enhancement of understanding of the background of the invention and therefore it may contain information that does not form the prior art that is already known in this country to a person of ordinary skill in the art.

BRIEF SUMMARY

Various aspects of the present invention are directed to providing a structure for mounting a spare tire for antitheft.

According to various aspects of the present invention, a structure for mounting a spare tire for antitheft, may include a carrier support bracket on which a spare tire is mounted, a bracket mounted at a bottom surface of a vehicle and supporting the spare tire, and a carrier winding or unwinding a wire mounted at the carrier support bracket in order for the spare tire to be moved upwardly and downwardly, and the carrier may further include a carrier housing including a top surface formed with a through hole, and a bottom surface formed with a projecting hole, a shaft bolt rotatably mounted at the carrier housing and adapted to wind or unwind the wire by rotation thereof, and a socket to transmit a torque applied from an outside of the vehicle to the shaft bolt or to block the torque not to be transmitted to the shaft bolt.

The through hole and the projecting hole of the carrier housing may be coaxially disposed, and the shaft bolt may penetrate the through hole and the projecting hole.

A height of the projecting hole may be equal to or greater than a height of the shaft bolt projecting from a lower portion of the carrier housing.

The shaft bolt may include a bolt portion rotatably mounted on the top surface of the carrier housing, and a shaft portion formed to be downwardly projected from a bottom surface of the bolt portion.

The shaft portion may include a first engaging portion disposed at a lowest end portion of the shaft portion and formed with a multiple angular columnar shape for mounting the socket to the shaft bolt.

The shaft portion may include a torque transmitting portion disposed at an upper end portion of the first engaging portion and formed with a multiple angular columnar shape to which a torque applied to the socket from the outside of the vehicle may be transmitted from the socket.

The shaft portion may include a second engaging portion disposed at an upper end portion of the torque transmitting portion, formed with an inclined cylindrical shape of which a diameter of a top surface thereof may be greater than that of a bottom surface thereof and fixing the position of the socket so that the torque received from the socket is transmitted to the torque transmitting portion.

The shaft portion may include a torque blocking portion arranged at an upper end portion of the second engaging portion and formed with a cylindrical shape for blocking the torque transmitted from the socket not to be transmitted to the shaft portion.

A minimum width of the first engaging portion passing through a central axis of the first engaging portion may exceed a minimum width of the torque transmitting portion passing through a central axis of the torque transmitting portion.

The diameter of the top surface of the second engaging portion may exceed a minimum width of the torque transmitting portion passing through a central axis of the torque transmitting portion.

A minimum width of the torque transmitting portion passing through a central axis of the torque transmitting portion may exceed a diameter of the torque blocking portion.

The socket may include a contacting portion to which a torque for rotating the socket may be applied from the outside of the vehicle and formed with a multiple angular columnar shape.

The socket may include a transmitting portion arranged at a top surface of the contacting portion in order to transmit the torque applied to the contacting portion to the shaft bolt, and formed with a cylindrical shape.

An inner space of a cylindrical shape may be formed in the socket.

The transmitting portion may include a multiple angular hole formed at a top surface of the transmitting portion in order to communicate the inner space with an outside of the socket.

A minimum width of the multiple angular hole passing through a central axis of the multiple angular hole may exceed a diameter of the torque blocking portion.

A minimum width of the multiple angular hole passing through a central axis of the multiple angular hole may be equal to or greater than a minimum width of the torque transmitting portion passing through a central axis of the torque transmitting portion.

A minimum width of the multiple angular hole passing through a central axis of the multiple angular hole may be less than a minimum width of the first engaging portion passing through a central axis of the first engaging portion.

A minimum width of the multiple angular hole passing through a central axis of the multiple angular hole may be less than a diameter of a top surface of the second engaging portion.

A diameter of the inner space may exceed a maximum width of the first engaging portion and a diameter of a top surface of the second engaging portion.

According to the present invention as described above, it is possible of easily mounting the spare tire in a manufacturing process and preventing a shaft bolt from being operated outside after vehicle delivery, thereby preventing spare tire theft.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
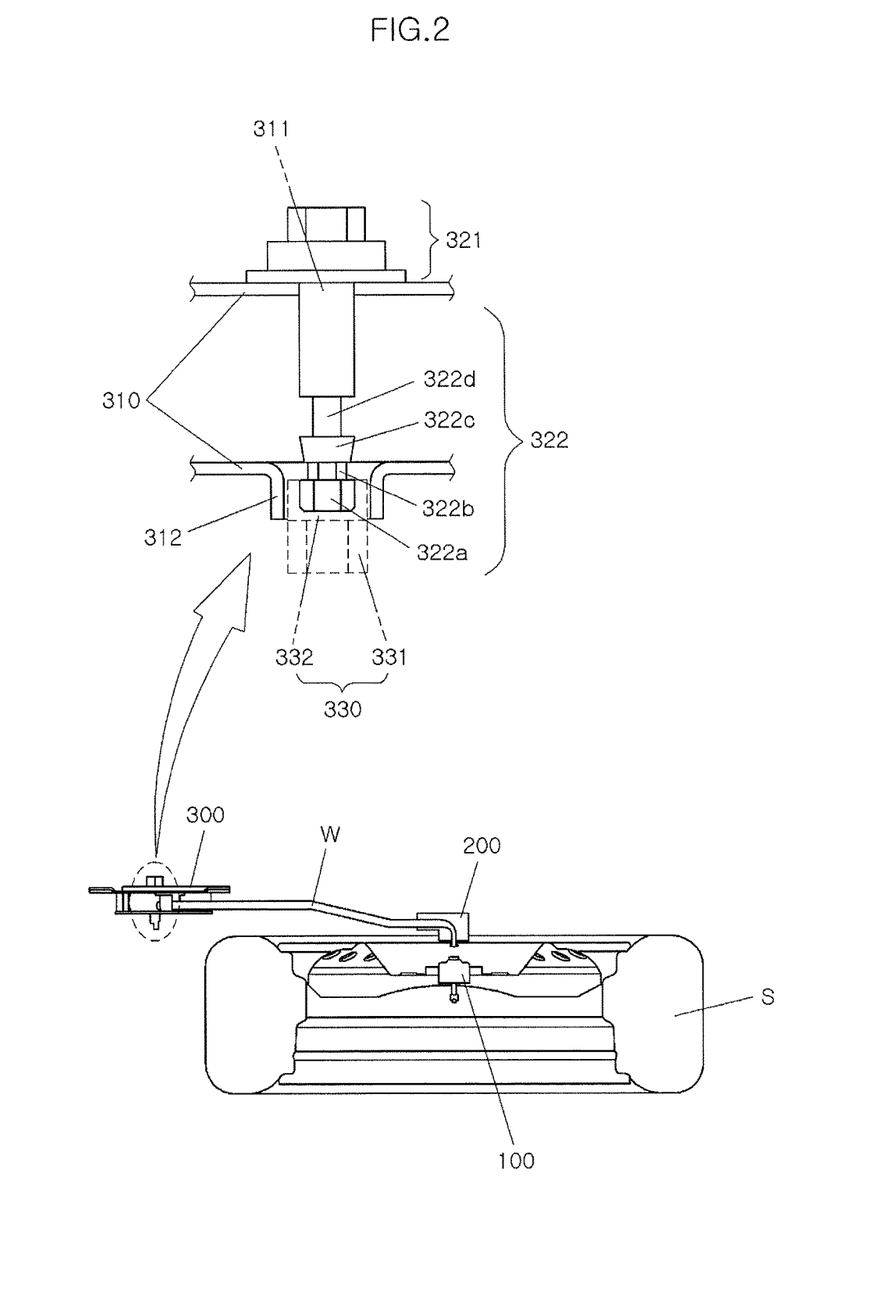
FIG. 2 is a schematic diagram of an exemplary structure for mounting a spare tire for antitheft according to the present invention.
Figure 3:
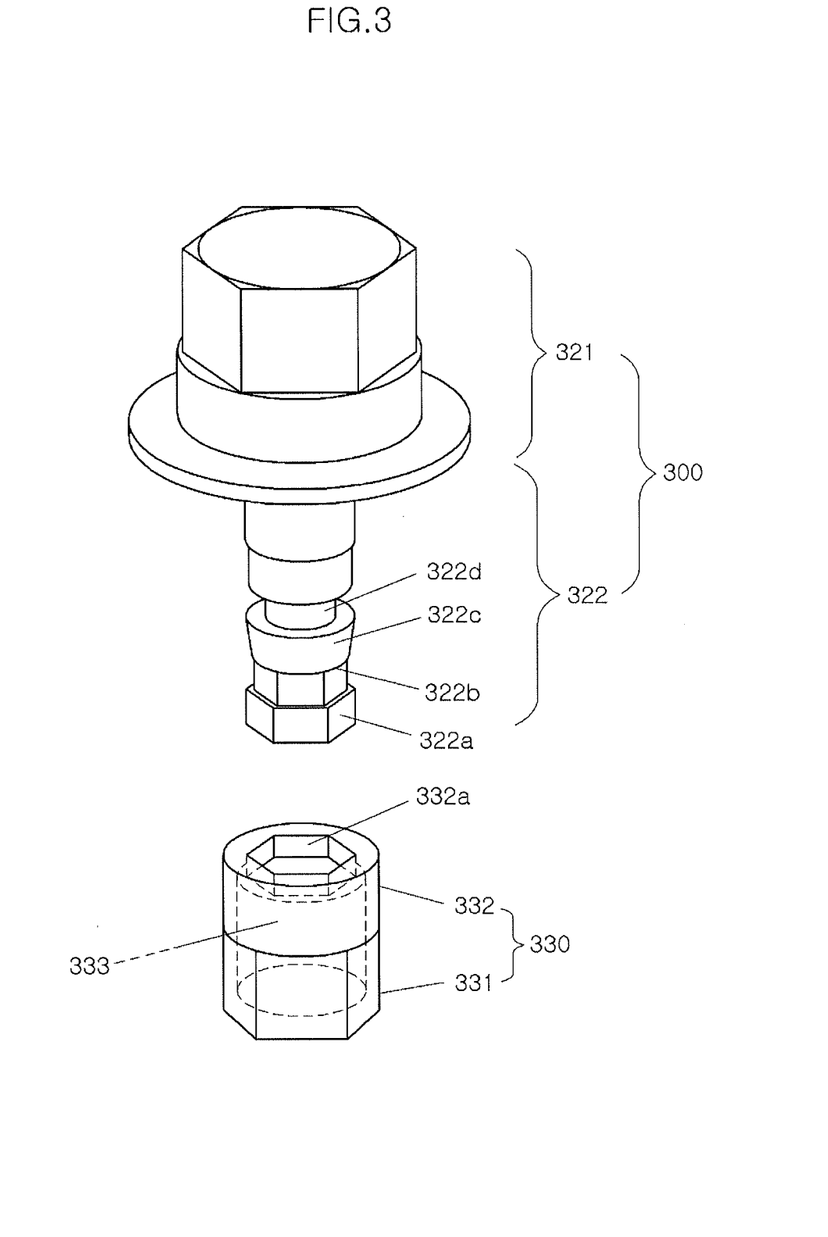
FIG. 3 is a perspective view of a shaft bolt and a socket according to the present invention.

FIG. 2 is a schematic diagram of a structure for mounting a spare tire for antitheft according to various embodiments of the present invention and FIG. 3 is a perspective view of a shaft bolt and a socket according to an exemplary embodiment of the present invention. Referring to FIGS. 2 and 3, a structure for mounting a spare tire for antitheft according to various embodiments of the present invention may include a carrier support bracket 100 on which a spare tire S is mounted, a bracket 200 mounted at a bottom surface of a vehicle and supporting the spare tire S, and a carrier 300 winding or unwinding a wire W mounted at the carrier support bracket 100 in order for the spare tire S to be moved upwardly and downwardly.

The carrier 300 may include a carrier housing 310, a shaft bolt 320 and a socket 330. A through hole 311 may be formed at a top surface of the carrier housing 310 and a projecting hole 312, which is projected downwardly and has a cylindrical form, may be formed at a bottom surface of the carrier housing 310.

The through hole 311 and the projecting hole 312 of the carrier housing 310 may be coaxially arranged. This is because a shaft portion 332 to be described later is arranged with penetrating the through hole 311 and the projecting hole 312.

The height of the projecting hole 312 may be equal to or greater than the height of the shaft bolt 320 projecting from a lower portion of the carrier housing 310. That is, the height of the projecting hole 312 is the height that the socket 330 is able to be completely inserted into the projecting hole 312 when the socket 330 is pushed up after the spare tire S is mounted on a vehicle in a manufacturing process of a vehicle.

Figure 4:
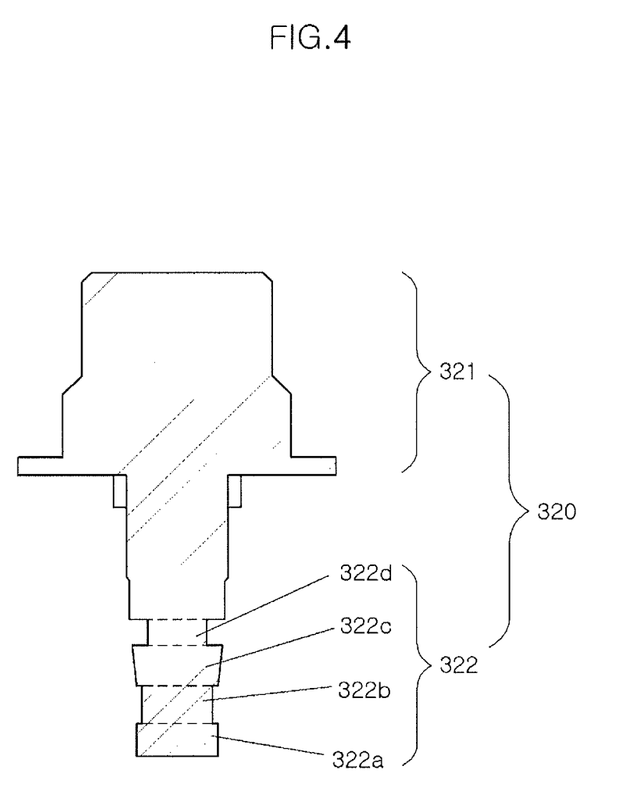
FIG. 4 is a cross sectional view of the shaft bolt according to the present invention.

FIG. 4 is a cross sectional view of the shaft bolt according to various embodiments of the present invention. Referring to FIG. 4, the shaft bolt 320 may be rotatably mounted at the carrier housing 310 and may be a configuration element for winding or unwinding the wire W by its rotation. The shaft bolt 320 may include a bolt portion 321 and the shaft portion 322.

The bolt portion 321 may be rotatably mounted on the top surface of the carrier housing 310. That is, the bolt portion 321 may be a configuration element for imposing a torque when a driver mounts the spare tire S on a vehicle or separates the spare tire S from the vehicle, after vehicle delivery.

The shaft portion 322 may be formed to be downwardly projected from a bottom surface of the bolt portion 321. The shaft portion 322 may include a first engaging portion 322a, a torque transmitting portion 322b, a second engaging portion 322c and a torque blocking portion 322d.

The first engaging portion 322a may be arranged at a lowest end portion of the shaft portion 322 and a configuration element of a multiple angular columnar shape for mounting the socket 330 to the shaft bolt 320. That is, the first engaging portion 322a may be inserted into a multiple angular hole 332a of the socket 330 to be penetrated, thereby preventing the socket 330 from being separated from the shaft portion 322.

The torque transmitting portion 332b may be disposed at an upper end portion of the first engaging portion 332a and a configuration element of the multiple angular columnar shape to which a torque applied to the socket 330 from the outside of a vehicle is transmitted from the socket 330. That is, the torque transmitting portion 332b is inserted into the multiple angular hole 332a and contacted with an inner circumference surface of the multiple angular hole 332a during mounting the spare tire S in the manufacturing process of a vehicle. Therefore, if a worker applies a torque to the socket 330, the torque is transmitted to the torque transmitting portion to rotate the shaft bolt 320.

The second engaging portion 322c may be disposed at an upper end portion of the torque transmitting portion and a configuration element of an inclined cylindrical shape of which the diameter of a top surface is greater than that of a bottom surface, and fix the position of the socket 330 so that the torque received from the socket 330 is transmitted to the torque transmitting portion 332b.

Furthermore, the diameter of the top surface of the second engaging portion 322c may be greater than the minimum width of the torque transmitting portion 322b passing through the central axis of the torque transmitting portion 322b. At this time, it is desirable that the diameter of the bottom surface of the second engaging portion 322c is equal to or slightly greater than the minimum width of the torque transmitting portion 322b passing through the central axis of the torque transmitting portion 322b. This is to prevent the socket 300 from being completely inserted into the projecting hole 312 unless an external force pushing up the socket 300 is applied thereto.

Therefore, the inner circumference surface of the multiple angular hole 332a of the socket 300 maintains to be contacted with an outer circumference surface of the torque transmitting portion 322b in the manufacturing process of a vehicle. If a worker applies an external to the socket 300, the torque is transmitted to the torque transmitting portion 322b without being dispersed to rotate the shaft bolt 320.

The torque blocking portion 322d may be disposed at an upper end portion of the second engaging portion 322c and a configuration element of a cylindrical shape for blocking the torque transmitted from the socket 300 not to be transmitted to the shaft portion 322.

That is, a worker pushes up the socket 300 to be completely inserted into the projecting hole 312 after mounting the spare tire S on a vehicle in the manufacturing process of a vehicle. At this time, the torque blocking portion 322d is located into the multiple angular hole 322a and the diameter of the torque blocking portion 322d becomes less than the minimum width of the multiple angular hole 322a.

Therefore, after vehicle delivery, even if applying a torque to the socket 300, the torque is blocked by the torque blocking portion 322d so that only the socket 300 runs idle and the shaft bolt 320 is not rotated. Accordingly, after vehicle delivery, since it is not able to rotate the shaft bolt 320 from the outside of a vehicle, it is possible of preventing the spare tire theft.

The minimum width of the first engaging portion 322a passing through the central axis of the first engaging portion 322a may exceed the minimum width of the torque transmitting portion 322b passing through the central axis of the torque transmitting portion 322b.

In addition, the diameter of the top surface of the second engaging portion 322c may exceed the minimum width of the torque transmitting portion 322b passing through the central axis of the torque transmitting portion 322b. At this time, it is desirable that the diameter of the bottom surface of the second engaging portion 322c is same to or slightly greater than the minimum width of the torque transmitting portion 322b passing through the central axis of the torque transmitting portion 322b. This is to prevent the socket 300 from being completely inserted into the projecting hole 312 unless an external force pushing up the socket 300 is applied thereto.

Accordingly, it is possible to fix the position of the socket 300 so that the inner circumference surface of the multiple angular hole 332a can be contacted with the torque transmitting portion 322b. Therefore, if a worker applies a torque to the socket 300, the torque is transmitted to the torque transmitting portion 322b just so without being dispersed to rotate the shaft bolt 320.

The minimum width of the torque transmitting portion 322b passing through the central axis of the torque transmitting portion 322b may exceed the diameter of the torque blocking portion 322d. This is because the torque can be blocked by the torque blocking portion 322d even though applying the torque to the socket 300 only when the diameter of the torque transmitting portion 322d locating into the multiple angular hole 322a after vehicle delivery should be small in comparison with the torque transmitting portion 322b contacting with the inner circumference surface of the multiple angular hole 322a in the manufacturing process of a vehicle.

Figure 5:
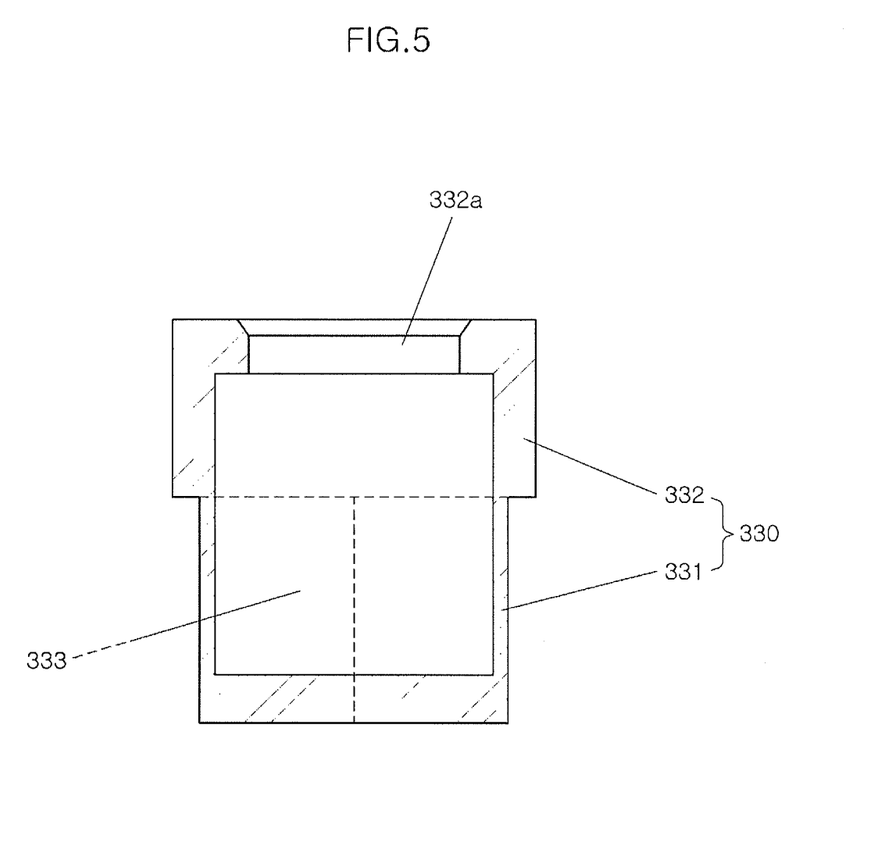
FIG. 5 is a cross sectional view of the socket according to the present invention.

FIG. 5 is a cross sectional view of the socket according to various embodiments of the present invention. Referring to FIG. 5, the socket 330 may play a role of transmitting a torque applied from the outside of a vehicle to the shaft bolt 320 or blocking the torque not to be transmitted to the shaft bolt 320. The socket 330 may include a contacting portion 331, a transmitting portion 332 and an inner space 333. In addition, the socket 330 may be formed of elastic material, particularly, plastic material so that a worker can push up the socket 330 to easily insert it into the projecting hole 312. However, it is not limited thereto and the socket 330 may be formed of various materials according to design preferences.

The contacting portion 331 may be a configuration element of multiple angular columnar shape to which applied a torque for rotating the socket 330 from the outside of a vehicle is applied. That is, a worker applies the torque to the contacting portion 331 using appropriate tools such as a wrench in the manufacturing process of a vehicle. Accordingly, the torque may rotate the shaft bolt 320 through the torque transmitting portion 332b contacting the inner circumference surface of the multiple angular hole 332a. Therefore, it is possible to easily mount the spare tire S on a vehicle from the outside of the vehicle.

The transmitting portion 332 may be disposed at the top surface of the contacting portion 331 and a configuration element of a cylindrical shape for transmitting the torque applied to the contacting portion 331 to the shaft bolt 320. The transmitting portion 332 may include a multiple angular hole 332a. The multiple angular hole 332a may be formed at the top surface of the transmitting portion 332 to communicate the inner space 333 with the outside of the socket 330.

At this time, the minimum width of the multiple angular hole 332a passing through the central axis of the multiple angular hole 332a may exceed the diameter of the torque blocking portion 332d. That is, the diameter of the torque blocking portion 332d may be less than the minimum width of the multiple angular hole 332a.

In the final manufacturing process of a vehicle, a worker may push the socket 330 up by applying an external force. According to this, the socket 330 is completely inserted into the projecting hole 312 so that the torque blocking portion 322d is positioned at the inside of the multiple angular hole 332a.

According to this, after vehicle delivery, even though applying a torque to the socket 330, since the torque is blocked by the torque blocking portion 332d, only the socket 330 runs idle and the shaft bolt 320 is not rotated. Therefore, since it is impossible to rotate the shaft bolt 320 from the outside of a vehicle after vehicle delivery, theft of the spare tire may be prevented.

Furthermore, the minimum width of the multiple angular hole 332a passing through the central axis of the multiple angular hole 332a may be equal to or greater than the minimum width of the torque transmitting portion 322b passing through the central axis of the torque transmitting portion 322b.

That is, during mounting the spare tire S on a vehicle in the manufacturing process of a vehicle, the torque transmitting portion 322b is inserted into the multiple angular hole 332a so that the inner surface of the multiple angular hole 332a is contacted with the outer circumference surface of the torque transmitting portion 322b. According to this, if a worker applies a torque to the socket 330, the torque is transmitted to the torque transmitting portion 322b to rotate the shaft bolt 320.

In the case that the minimum width of the multiple angular hole 332a passing through the central axis of the multiple angular hole 332a is equal to the minimum width of the torque transmitting portion 322b passing through the central axis of the torque transmitting portion 322b, the torque applied to the socket 330 from the outside of a vehicle can be transmitted to the shaft bolt 320 to be maximum. Only in order for a worker to easily insert the socket 330 into the projecting hole 312 after mounting the spare tire S on a vehicle in the manufacturing process of a vehicle, it will be desirable to set the minimum width of the multiple angular hole 332a passing through the central axis of the multiple angular hole 332a to be slightly greater than the minimum width of the torque transmitting portion 322b passing through the central axis of the torque transmitting portion 322b.

The minimum width of the multiple angular hole 332a passing through the central axis of the multiple angular hole 332a may be less than the minimum width of the first engaging portion 322a passing through the central axis of the first engaging portion 322a.

In addition, the minimum width of the multiple angular hole 332a passing through the central axis of the multiple angular hole 332a may be less than the diameter of the top surface of the second engaging portion 322c. At this time, it is desirable that the minimum width of the multiple angular hole 332a passing through the central axis of the multiple angular hole 332a is same to the diameter of the bottom surface of the second engaging portion 322c or the diameter of the bottom surface of the second engaging portion 322c is slightly greater than the minimum width of the multiple angular hole 332a. This is to prevent the socket 330 from being completely inserted into the projecting hole 312 unless an external pushing up the socket 330 is not applied.

According to this, the position of the socket 300 may be fixed so that the inner circumference surface of the multiple angular hole 332a can be contacted with the torque transmitting portion 322b in the manufacturing process of a vehicle. Therefore, if a worker applies a torque to the socket 330, the torque is transmitted to the torque transmitting portion 322b just so without being dispersed to rotate the shaft bolt 320.

At the inside of the socket 330 may be formed the inner space 333 of a cylindrical shape. At this time, the diameter of the inner space 333 may exceed the maximum width of the first engaging portion 322a and the diameter of the top surface of the second engaging portion 322c.

That is, after vehicle delivery, in the inner space 333 may be located the first engaging portion 322a, the torque transmitting portion 322b and the second engaging portion 322c. However, after vehicle delivery, even though a torque is applied to the socket 330 from the outside of a vehicle, the socket 330 should be run idle by the torque transmitting portion 322d. Therefore, the diameter of the inner space 333 exceeds the maximum width of the first engaging portion 322a and the diameter of the top surface of the second engaging portion 322c so that it is necessary to prevent the torque of the socket 330 from being transmitted to the shaft bolt 320 through the first engaging portion 322a and the second engaging portion 322c.

Figure 6:
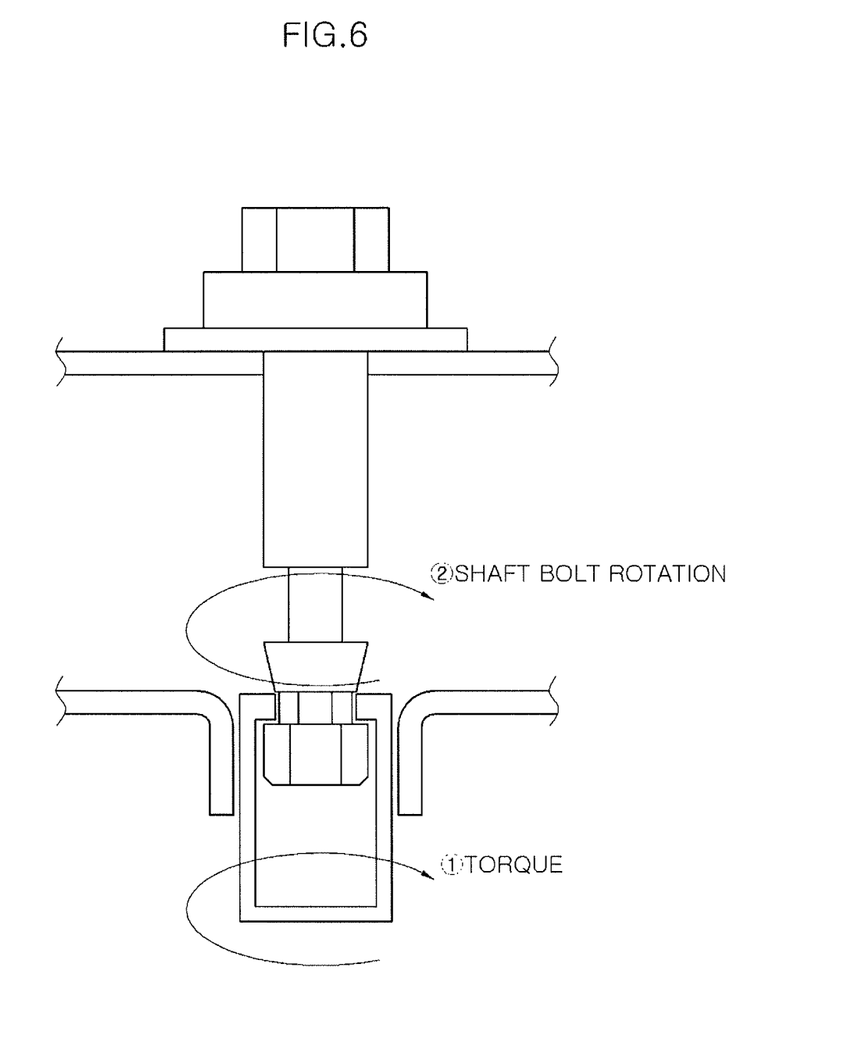
FIG. 6 and FIG. 7 are drawings of operational status of a structure for mounting a spare tire for antitheft according to the present invention.
Figure 7:
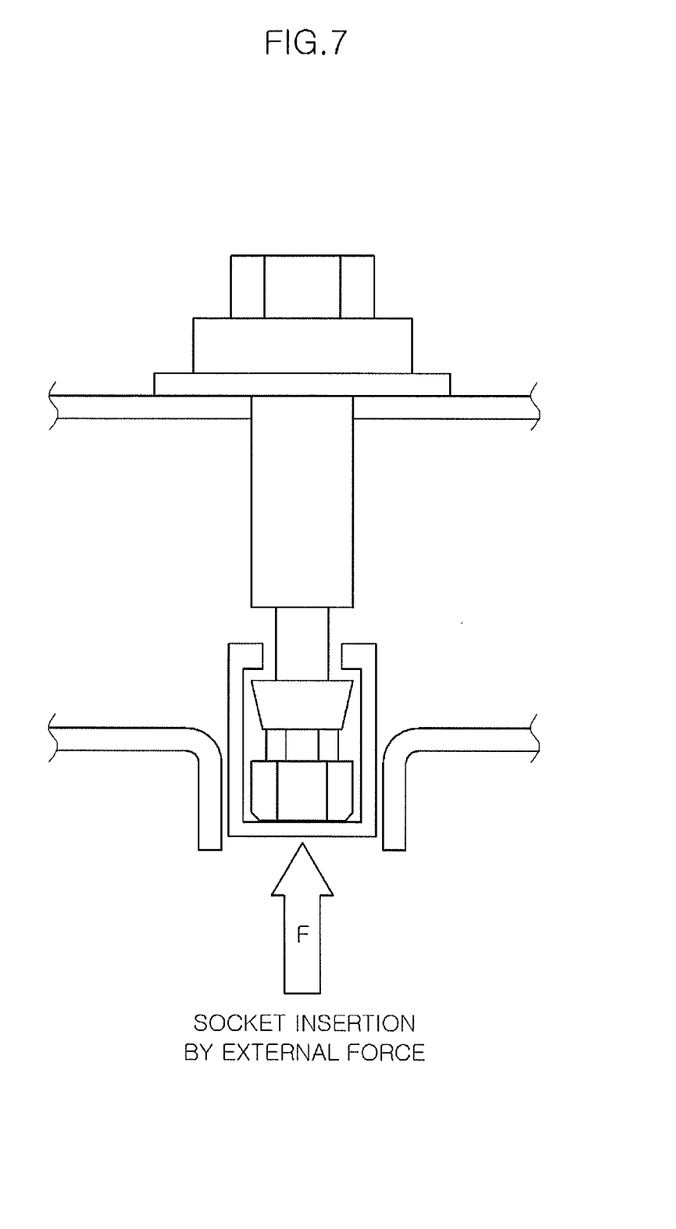

FIGS. 6 and 7 are drawings of operational status of a structure for mounting a spare tire for antitheft according to various embodiments of the present invention. As shown in FIG. 6, in the manufacturing process of a vehicle, the socket 330 should be projected toward the outside of the projecting hole 312 in the carrier housing 310. Explaining more in detail, in the manufacturing process of a vehicle, the inner circumference surface of the multiple angular hole 332a is contacted with the torque transmitting portion 322b, the second engaging portion 322c is connected to the top surface of the torque transmitting portion 332 and the first engaging portion 322a is connected to the top surface of the inner space 333.

Therefore, the torque applied to the socket 330 by a worker is transmitted to the shaft bolt 320 maximally. Accordingly, the worker may easily mount the spare tire S on a vehicle.

Furthermore, as shown in FIG. 7, after mounting the spare tire S on a vehicle, a worker pushes up the socket 330 to be completely inserted into the projecting hole 312. Explaining more in detail, the torque blocking is located into the multiple angular hole 332a, and the first engaging portion 322a, the torque transmitting portion 322b and the engaging portion 322a are located in the inner space 333.

Therefore, after mounting the spare tire S on a vehicle (that is, after vehicle delivery), even though applying a torque to the socket 330, the torque is blocked by the torque blocking portion 322d so that only the socket 300 runs idle and the shaft bolt 320 is not rotated. According to this, since it is impossible to rotate the shaft bolt from the outside of a vehicle after vehicle delivery, spare tire theft is prevented.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A structure for mounting a spare tire for antitheft, including a carrier support bracket on which a spare tire is mounted, a bracket mounted at a bottom surface of a vehicle and supporting the spare tire, and a carrier winding or unwinding a wire mounted at the carrier support bracket in order for the spare tire to be moved upwardly and downwardly, the carrier further comprising:
    a carrier housing including a top surface formed with a through hole, and a bottom surface formed with a projecting hole;
    a shaft bolt rotatably mounted at the carrier housing and adapted to wind or unwind the wire by rotation thereof; and
    a socket connected to the shaft bolt, the socket configured to transmit a torque applied from an outside of the vehicle to the shaft bolt and also configured to block the torque from being transmitted to the shaft bolt.

2. The structure for mounting the spare tire for antitheft of claim 1, wherein the through hole and the projecting hole of the carrier housing are coaxially disposed, and
    the shaft bolt penetrates the through hole and the projecting hole.

3. The structure for mounting the spare tire for antitheft of claim 1, wherein a height of the projecting hole is equal to or greater than a height of the shaft bolt projecting from a lower portion of the carrier housing.

4. The structure for mounting the spare tire for antitheft of claim 1, wherein the shaft bolt comprises:
    a bolt portion rotatably mounted on the top surface of the carrier housing; and
    a shaft portion formed to be downwardly projected from a bottom surface of the bolt portion.

5. The structure for mounting the spare tire for antitheft of claim 4, wherein the shaft portion comprises a first engaging portion disposed at a lowest end portion of the shaft portion and formed with a multiple angular columnar shape for mounting the socket to the shaft bolt.

6. The structure for mounting the spare tire for antitheft of claim 5, wherein the shaft portion comprises a torque transmitting portion disposed at an upper end portion of the first engaging portion and formed with a multiple angular columnar shape to which a torque applied to the socket from the outside of the vehicle is transmitted from the socket.

7. The structure for mounting the spare tire for antitheft of claim 6, wherein the shaft portion comprises a second engaging portion disposed at an upper end portion of the torque transmitting portion, formed with an inclined cylindrical shape of which a diameter of a top surface thereof is greater than that of a bottom surface thereof and fixing the position of the socket so that the torque received from the socket is transmitted to the torque transmitting portion.

8. The structure for mounting the spare tire for antitheft of claim 7, wherein the shaft portion comprises a torque blocking portion arranged at an upper end portion of the second engaging portion and formed with a cylindrical shape for blocking the torque transmitted from the socket not to be transmitted to the shaft portion.

9. The structure for mounting the spare tire for antitheft of claim 8, wherein a minimum width of the first engaging portion passing through a central axis of the first engaging portion exceeds a minimum width of the torque transmitting portion passing through a central axis of the torque transmitting portion.

10. The structure for mounting the spare tire for antitheft of claim 8, wherein the diameter of the top surface of the second engaging portion exceeds a minimum width of the torque transmitting portion passing through a central axis of the torque transmitting portion.

11. The structure for mounting the spare tire for antitheft of claim 8, wherein a minimum width of the torque transmitting portion passing through a central axis of the torque transmitting portion exceeds a diameter of the torque blocking portion.

12. The structure for mounting the spare tire for antitheft of claim 1, wherein the socket comprises a contacting portion to which a torque for rotating the socket is applied from the outside of the vehicle and formed with a multiple angular columnar shape.

13. The structure for mounting the spare tire for antitheft of claim 12, wherein the socket comprises a transmitting portion arranged at a top surface of the contacting portion in order to transmit the torque applied to the contacting portion to the shaft bolt, and formed with a cylindrical shape.

14. The structure for mounting the spare tire for antitheft of claim 13, wherein an inner space of a cylindrical shape is formed in the socket.

15. The structure for mounting the spare tire for antitheft of claim 14, wherein the transmitting portion comprises a multiple angular hole formed at a top surface of the transmitting portion in order to communicate the inner space with an outside of the socket.

16. The structure for mounting the spare tire for antitheft of claim 15, wherein a minimum width of the multiple angular hole passing through a central axis of the multiple angular hole exceeds a diameter of the torque blocking portion.

17. The structure for mounting the spare tire for antitheft of claim 15, wherein a minimum width of the multiple angular hole passing through a central axis of the multiple angular hole is equal to or greater than a minimum width of the torque transmitting portion passing through a central axis of the torque transmitting portion.

18. The structure for mounting the spare tire for antitheft of claim 15, wherein a minimum width of the multiple angular hole passing through a central axis of the multiple angular hole is less than a minimum width of the first engaging portion passing through a central axis of the first engaging portion.

19. The structure for mounting the spare tire for antitheft of claim 15, wherein a minimum width of the multiple angular hole passing through a central axis of the multiple angular hole is less than a diameter of a top surface of the second engaging portion.

20. The structure for mounting a spare tire for antitheft of claim 15, wherein a diameter of the inner space exceeds a maximum width of the first engaging portion and a diameter of a top surface of the second engaging portion.

* * * * *